United States Patent [19]
Kaji

[11] Patent Number: 5,838,370
[45] Date of Patent: Nov. 17, 1998

[54] IMAGE PICKUP APPARATUS

[75] Inventor: Toshio Kaji, Yokohama, Japan

[73] Assignee: Canon Kabushiki Kaisha, Tokyo, Japan

[21] Appl. No.: 531,559

[22] Filed: Sep. 18, 1995

[30] Foreign Application Priority Data

Sep. 20, 1994 [JP] Japan ................................. 6-224963

[51] Int. Cl.⁶ ..................................................... H04N 5/232

[52] U.S. Cl. ............................ 348/240; 348/358; 348/347

[58] Field of Search ..................................... 348/207, 221, 348/222, 240, 345, 346, 347, 362–364, 358, 561, 581; H04N 5/232

[56] References Cited

U.S. PATENT DOCUMENTS 5,475,426  12/1995  Kinugasa et al. ....................... 348/240
5,502,484   3/1996  Okada ..................................... 348/240

FOREIGN PATENT DOCUMENTS 14241  1/1994  Japan ............................. H04N 5/232

*Primary Examiner*—Glenton B. Burgess
*Attorney, Agent, or Firm*—Robin, Blecker, Daley & Driscoll

[57] ABSTRACT

An image pickup apparatus comprises an image enlargement circuit for enlarging an image around a viewpoint position in a picture and a control circuit for changing a focus detection area or a photometry area to an area having position and size adaptive to an enlarged image, prior to an enlargement operation by the image enlargement circuit.

21 Claims, 9 Drawing Sheets

FIG. 3A
FIG. 3B
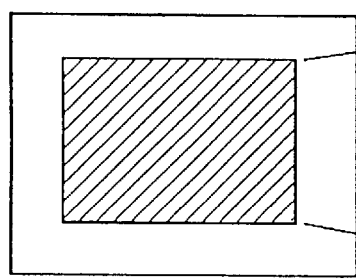
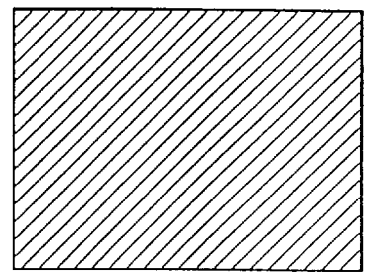
FIG. 3C
FIG. 3D
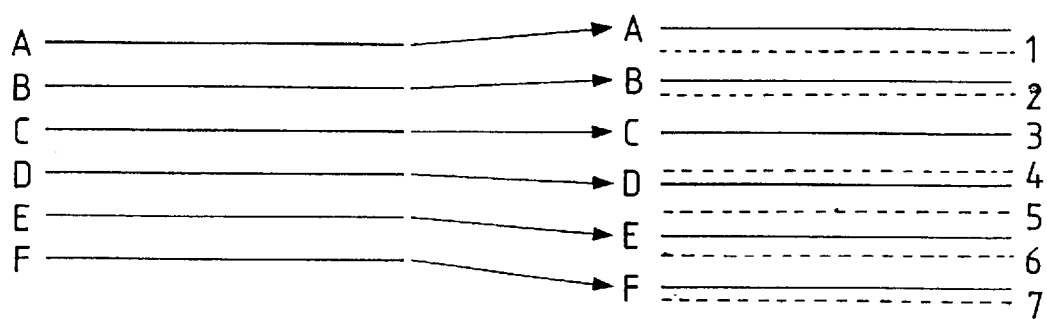

IMAGE PICKUP APPARATUS

BACKGROUND OF THE INVENTION

1. Field of the Invention

The present invention relates to an image pickup apparatus having a function of electronically enlarging an image.

2. Related Background Art

Video equipment such as video tape recorders with built-in cameras has recently made remarkable advances. With advances in digital image processing in particular, various image processing functions have been incorporated in video equipment.

Under the circumstances, various electronic image enlargement means have been proposed. For example, a so-called electronic zoom function electronically performs enlargement processing of an image by using digital image processing instead of optically zooming on an object to be photographed by using a zoom lens as in a conventional technique. An electronic closeup function electronically and instantaneously enlarges a portion of an image obtained by an image pickup element at a predetermined magnification.

Such an electronic image enlargement means allows a quick, easy zooming operation because an optical system need not be moved unlike an optical zoom means. In addition, if this enlargement means is used together with an optical zoom function, the arrangement of the optical system can be simplified. For these reasons, this enlargement function is widely used.

The following problem, however, is posed in an apparatus having the above electronic image enlargement processing function.

A recent video tape recorder with a built-in camera includes an automatic focus detection means and an automatic exposure control means as standard equipment. Each of these functions uses a predetermined area in a frame as a focus detection range or a photometric range for exposure control.

In general, the image enlargement range based on the above electronic image enlargement processing function, the focus detection range, and the photometric range for exposure control are independently set. For this reason, even if the image angle is changed upon execution of the electronic image enlargement processing function, the positions and sizes of the focus detection and photometric ranges are not updated following the change in image angle. Consequently, the exposure level and focus detection position of an image having undergone the enlarging operation may not be proper, and the image seems incongruous.

SUMMARY OF THE INVENTION

The present invention has been made to solve the above problem, and has as its first object to realize a smooth, stable electronic zoom operation in an image pickup apparatus having an electronic zoom function.

It is the second object of the present invention to stabilize an image pickup state in executing the electronic zoom function.

It is the third object of the present invention to provide an image pickup apparatus in which when the user executes an enlargement function such as an electronic zoom function or an electronic closeup function, exposure control and focus detection are performed at the same time as the image angle to be enlarged is determined, and exposure control and focus detection control are completed at the same time as actual enlargement processing is completed, thereby obtaining a proper image.

In order to achieve the above objects, according to a preferred embodiment of the present invention, there is provided an image pickup apparatus comprising image pickup means, enlargement means for performing enlargement processing of an image by electronically enlarging an image pickup signal output from the image pickup means, selection means for selecting a portion, of the image in a frame, which is to be enlarged by the enlargement means, focus detection means for detecting a focus state by extracting a predetermined signal, which changes in accordance with the focus state, from an image pickup signal corresponding to a predetermined focus detection range in the frame, exposure control means for detecting an exposure state by extracting a signal corresponding to the exposure state from the image pickup signal corresponding to a predetermined exposure control range in the frame, and control means for operating the focus detection means and the exposure control means in accordance with a selecting operation performed by the selection means to move positions of the focus detection range and the exposure control range to a position of an enlargement portion in the frame selected by the selection means.

According to another preferred embodiment of the present invention, there is provided an image pickup apparatus comprising image pickup means, interpolation means for performing interpolation processing for an image pickup signal output from the image pickup means, selection means for selecting a portion, of the image in a frame, which is to be interpolated by the interpolation means, focus detection means for detecting a focus state by extracting a predetermined signal, which changes in accordance with the focus state, from an image pickup signal corresponding to a predetermined focus detection range in the frame, exposure control means for detecting an exposure state by extracting a signal corresponding to the exposure state from the image pickup signal corresponding to a predetermined exposure control range in the frame, and control means for operating the focus detection means and the exposure control means in accordance with a selecting operation performed by the selection means to move positions of the focus detection range and the exposure control range to a position in the frame selected by the selection means, and also operating the focus detection means and the exposure control means to display the image interpolated by the interpolation means at the same time as the operations of the focus detection means and the exposure control means are completed.

According to still another preferred embodiment of the present invention, there is provided an image pickup apparatus comprising image pickup means, enlargement means for performing enlargement processing of an image by electronically enlarging an image pickup signal output from the image pickup means, selection means for selecting a portion, of the image in a frame, which is to be enlarged by the enlargement means, focus detection means for detecting a focus state by extracting a predetermined signal, which changes in accordance with the focus state, from an image pickup signal corresponding to a predetermined focus detection range in the frame, and control means for operating the focus detection means in accordance with a selecting operation performed by the selection means to move a position of the focus detection range to a position of an enlargement portion in the frame selected by the selection means.

According to still another preferred embodiment of the present invention, there is provided an image pickup apparatus comprising image pickup means, enlargement means for performing enlargement processing of an image by electronically enlarging an image pickup signal output from the image pickup means, selection means for selecting a portion, of the image in a frame, which is to be enlarged by the enlargement means, exposure control means for detecting an exposure state by extracting a signal corresponding to the exposure state from the image pickup signal corresponding to a predetermined exposure control range in the frame, and control means for operating the exposure control means in accordance with a selecting operation performed by the selection means to move a position of the exposure control range to a position of an enlargement portion in the frame selected by the selection means.

It is still another object of the present invention to provide an image pickup apparatus which can perform image enlargement processing, a focus adjusting operation, and an exposure control operation at proper timings without performing any complicated operation.

It is still another object of the present invention to provide an image pickup apparatus in which exposure control and focus detection control are completed upon completion of enlargement processing of an image.

The above and other objects, features, and advantages of the present invention will be apparent from the following detailed description in conjunction with the accompanying drawings and the appended claims.

BRIEF DESCRIPTION OF THE DRAWINGS

FIGS. 3A to 3D are views for explaining an electronic image enlarging operation;

DETAILED DESCRIPTION OF PREFERRED EMBODIMENTS

Image pickup apparatuses according to the embodiments of the present invention will be described in detail below.

Figure 1:
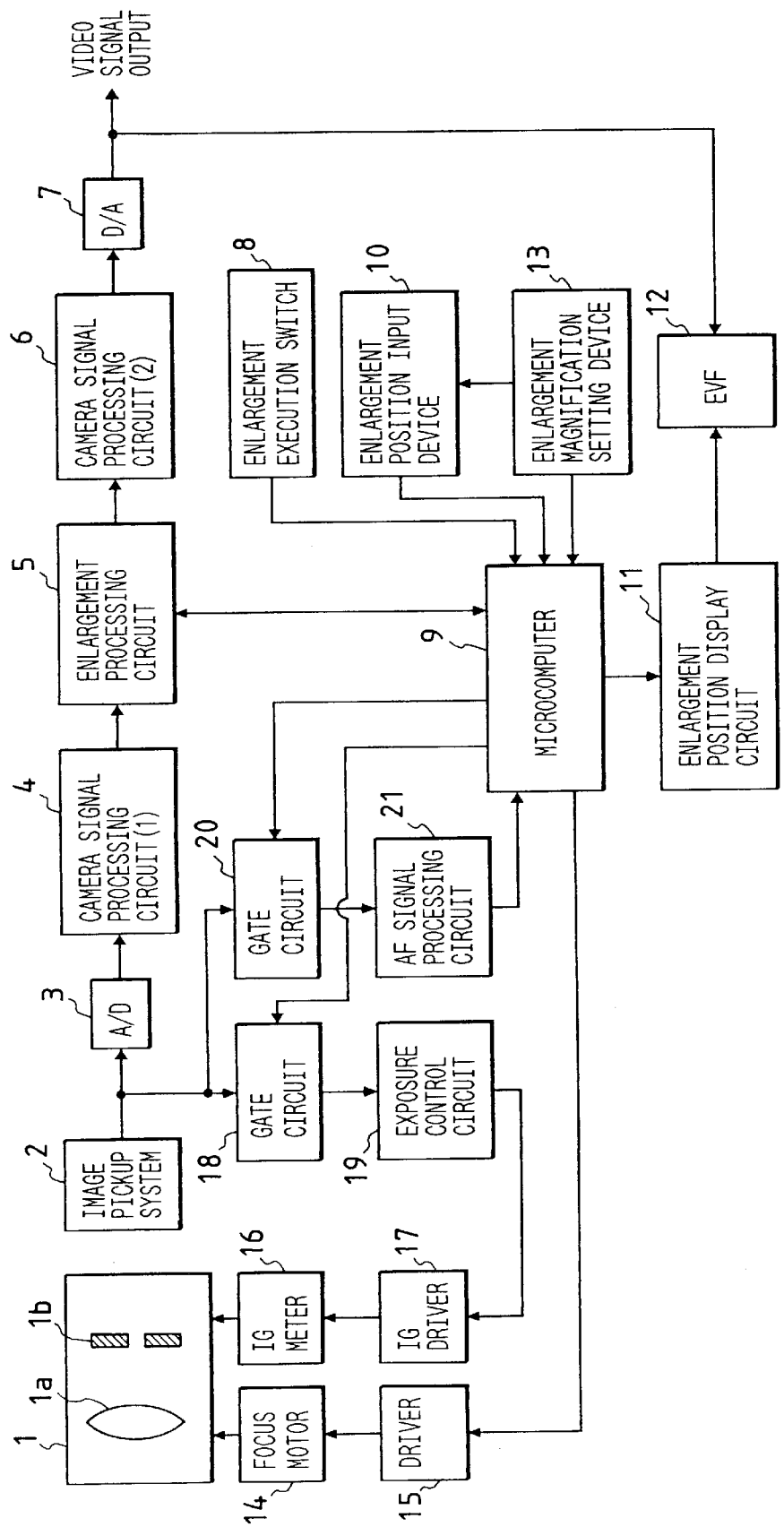
FIG. 1 is a block diagram showing the first embodiment of the present invention.

FIG. 1 is a block diagram showing the first embodiment in which the present invention is applied to a video camera.

Referring to FIG. 1, this embodiment includes an imaging lens 1 for an object to be photographed, a focus lens 1a for focus adjustment, and an iris 1b.

An image pickup system 2 is constituted by an image pickup element as an image pickup means for photoelectrically converting incident light, a correlation double sampling circuit (CDS), and the peripheral circuit of the image pickup element. An analog-digital converter (to be referred to as an A/D converter hereinafter) 3 converts the photoelectrically converted signal into a digital signal. A camera signal processing circuit (1) 4 generates a standardized video signal by performing predetermined signal processing such as processing of generating a luminance signal and chrominance signals from the image pickup signal output from the A/D converter 3, gamma conversion processing, blanking processing, and addition of a sync signal. An enlargement processing circuit 5 thins out pixels and scanning lines of the input video signal to enlarge the image, and outputs the enlarged image. A camera signal processing circuit (2) 6 performs processing such as interpolation of information between the pixels and scanning lines of the video signal having undergone thinning processing and enlargement processing in the enlargement processing circuit 5, and outputs the resultant image signal. The embodiment also includes a digital-analog converter (D/A converter) 7, an enlargement execution switch 8 which allows the user to input an enlargement instruction, a control microcomputer (to be referred to as a microcomputer hereinafter) 9 for controlling the overall video camera apparatus, an enlargement position input device 10 which allows the user to input an enlargement position in a frame, an enlargement position display circuit 11 for displaying the position information input through the enlargement position input device 10 on the screen of a monitor (to be described later), an electronic viewfinder (to be referred to as an EVF hereinafter) 12 as a monitor which allows the user to monitor a video signal output from the D/A converter 7 and a prospective enlargement position display signal from the enlargement position display circuit 11, and an enlargement magnification setting device 13 for setting an enlargement magnification.

A focus motor 14 moves the focus lens 1a. A driver 15 drives/controls the focus motor 14 in accordance with a control signal from the microcomputer 9. An IG meter 16 changes the aperture of the iris 1b. An IG driver 17 drives/controls the IG meter 16.

A gate circuit 18 for forming a photometric area transmits only a portion of an image pickup signal output from the image pickup system 2 which corresponds to a photometric frame in a frame. An exposure control circuit 19 integrates the image pickup signal extracted by the gate circuit 18 at a predetermined period, and controls the IG driver 17 to control the amount of incident light by driving/controlling the iris 1b such that the average value of the integration results is kept at a predetermined level. That is, the iris 1b is controlled to make the luminance level in the photometric area constant.

In this embodiment, exposure control is performed by using only an image pickup signal in a photometric area formed by the gate circuit 18. However, a frame may be divided into a plurality of photometric areas to detect the luminance levels in the respective areas, and the weighting coefficients for the luminance levels may be changed in the respective photometric areas, thereby performing center-weighted or multi-area photometry.

A gate circuit 20 for forming a focus detection area transmits only a portion of an image pickup signal output from the image pickup system 2 which corresponds to a focus detection area in a frame. An AF signal processing circuit 21 is constituted by a bandpass filter (to be referred to as a BPF hereinafter) for extracting a high-frequency component, which changes in accordance with the focus state, from an image pickup signal corresponding to a focus detection area and extracted by the gate circuit 20, a peak hold circuit for detecting the peak value of the high-frequency component extracted by the BPF within a one-field interval, and outputting the detected value to the microcomputer 9, and the like.

The microcomputer 9 controls the driver 15 to drive the focus lens 1a in a direction in which the peak value of the high-frequency component output from the AF signal processing circuit 21 increases, and stop the focus lens 1a at an in-focus position where the peak value is maximized finally.

Note that the gate circuit 18 and the gate circuit 20 can change the set positions in the respective frames under the control of the microcomputer 9.

Image pickup means will be seen to comprise lenses 1 and 1a, iris 1b and image pickup system 2. Image pickup control means will be seen to comprise gate circuit 18, exposure control circuit 19, focus motor 14, IG meter 16, driver 15 and IG driver 17.

With the above arrangement, light from an object is focused on the image pickup element of the image pickup system 2 through the imaging lens 1 to be photoelectrically converted, and the resultant signal is output as an image pickup signal through the correlation double sampling circuit (CDS) (not shown).

This image pickup is converted into a digital signal by the A/D converter 3. The digital signal is then subjected to predetermined processing in the camera signal processing circuit (1) 4, the enlargement processing circuit 5, the camera signal processing circuit (2) 6, and the D/A converter 7. The resultant signal is then converted into an analog signal. The analog signal is supplied to a video recorder (not shown) and is also supplied to the EVF 12 to be displayed.

Enlargement processing will be described next. In executing enlargement processing of an image, the user operates the enlargement execution switch 8, and the microcomputer 9 receives this input and controls the enlargement processing circuit 5.

An example of enlargement processing of an image which is performed by linear interpolation will be described below with reference to FIGS. 3A to 3D.

Assume that the hatched portion in FIG. 3A is enlarged to be displayed as shown in FIG. 3B. FIGS. 3C and 3D show the relationship between the scanning lines of the original image (FIG. 3A) and the enlarged image (FIG. 3B).

In order to convert the enlarged image (FIG. 3B) into a standard television signal, scanning lines [1] to [7] indicated by the broken lines must be generated from scanning lines [A] to [F] indicated by the solid lines in FIG. 3D.

In this case, the scanning lines indicated by the broken lines can be generated by multiplying the scanning lines indicated by the solid lines by weighting coefficients corresponding to the distances and adding the resultant values. By performing such linear interpolation processing in the vertical and horizontal directions, an original image can be enlarged at an arbitrary enlargement magnification.

Figure 4:
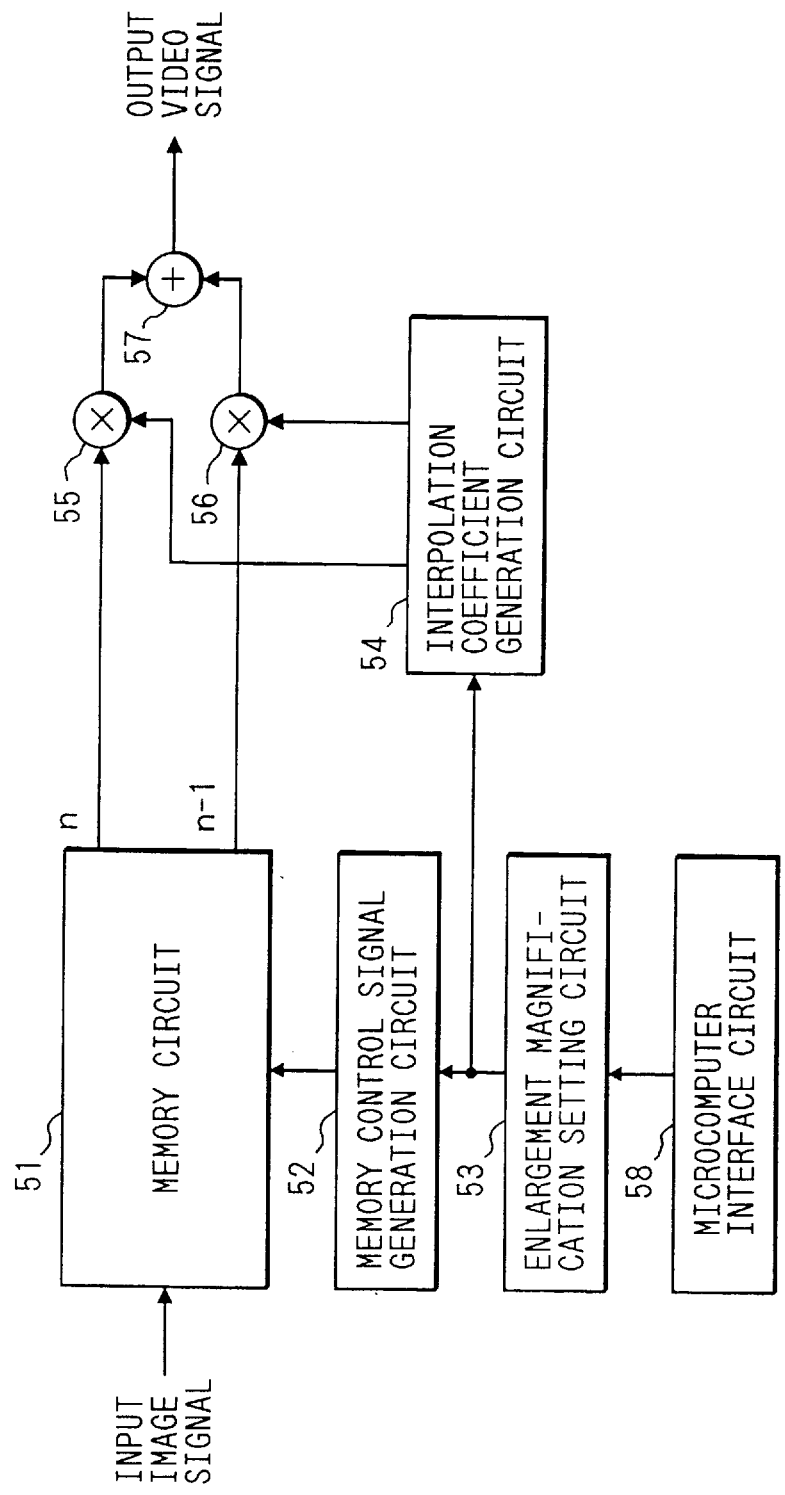
FIG. 4 is a block diagram showing a circuit arrangement for performing an electronic image enlarging operation.

FIG. 4 is a block diagram for explaining an example of the enlargement processing circuit 5. A memory circuit 51 stores a video signal output from the camera signal processing circuit (1) 4. The memory circuit 51 is designed to output a signal for the [n]th scanning line designated by a memory read control signal, and a signal for the [n−1]th scanning line delayed by 1H from the [n]th scanning line.

A memory control signal generation circuit 52 controls read/write access to the memory circuit 51. An enlargement magnification setting circuit 53 sets an enlargement magnification and an enlargement position. An interpolation coefficient generation circuit 54 generates interpolation coefficients in accordance with the enlargement magnification set by the enlargement magnification setting circuit 53. The enlargement processing circuit 5 also includes multipliers 55 and 56, an adder 57, and a microcomputer interface circuit 58 for receiving an enlargement magnification and an enlargement position from the microcomputer 9.

In response to a memory control signal, a signal for the [n]th scanning line and a signal for the [n−1]th scanning line are read out from the memory circuit 51 in which an input image signal is stored. At the same time, the interpolation coefficient generation circuit 54 outputs coefficients corresponding to the distances between the signals to be interpolated and the [n−1]th scanning line. The multipliers 55 and 56 then multiply the coefficients and the signal for the [n]th scanning line and the signal for the [n−1]th scanning line. The adder 57 adds the respective products to obtain a linear addition signal.

Figure 5:
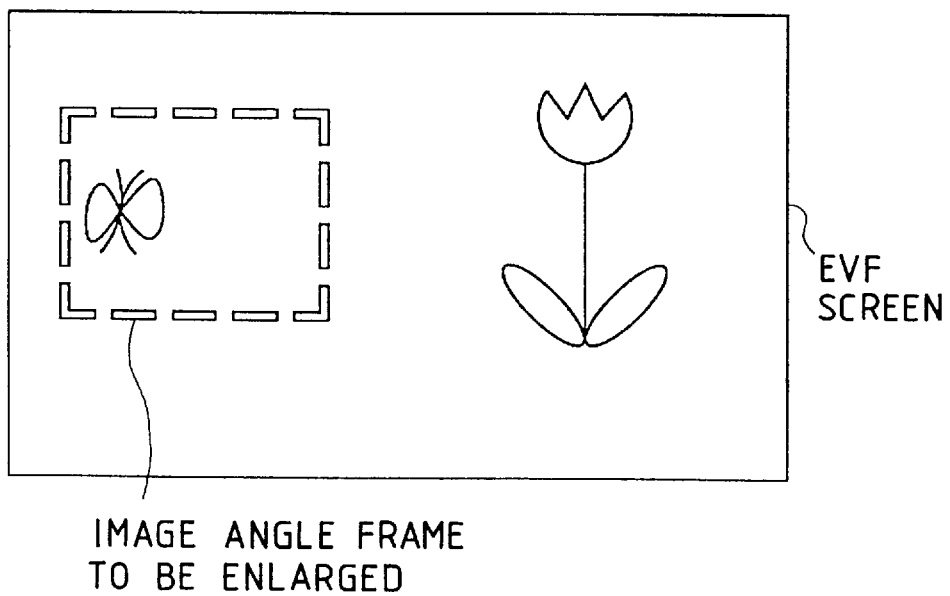
FIG. 5 is a view for explaining an electronic image enlarging operation.

FIG. 5 shows a display sample on the screen of the EVF 12 when an enlargement position and an enlargement magnification are to be input through the enlargement position input device 10 and the enlargement magnification setting device 13, respectively.

First of all, the user checks an image angle frame to be enlarged, which is displayed on the EVF 12, by using a prospective enlargement position signal from the enlargement position display circuit 11. The user then operates the enlargement position input device 10 and the enlargement magnification setting device 13, and checks whether the frame to be enlarged is at a desired position. Thereafter, the user turns on the enlargement execution switch 8 to execute enlargement processing.

In the above manner, an image at a desired position in a frame is enlarged at a desired magnification. Focus control and exposure control operations which are the characteristic features of the present invention and are to be performed upon execution of enlargement processing of an image will be described next. These control operations are also performed by the microcomputer 9.

The microcomputer 9 controls the exposure level and the focus state in accordance with the exposure level and the focus state which correspond to an image signal having undergone enlargement processing.

Figure 2:
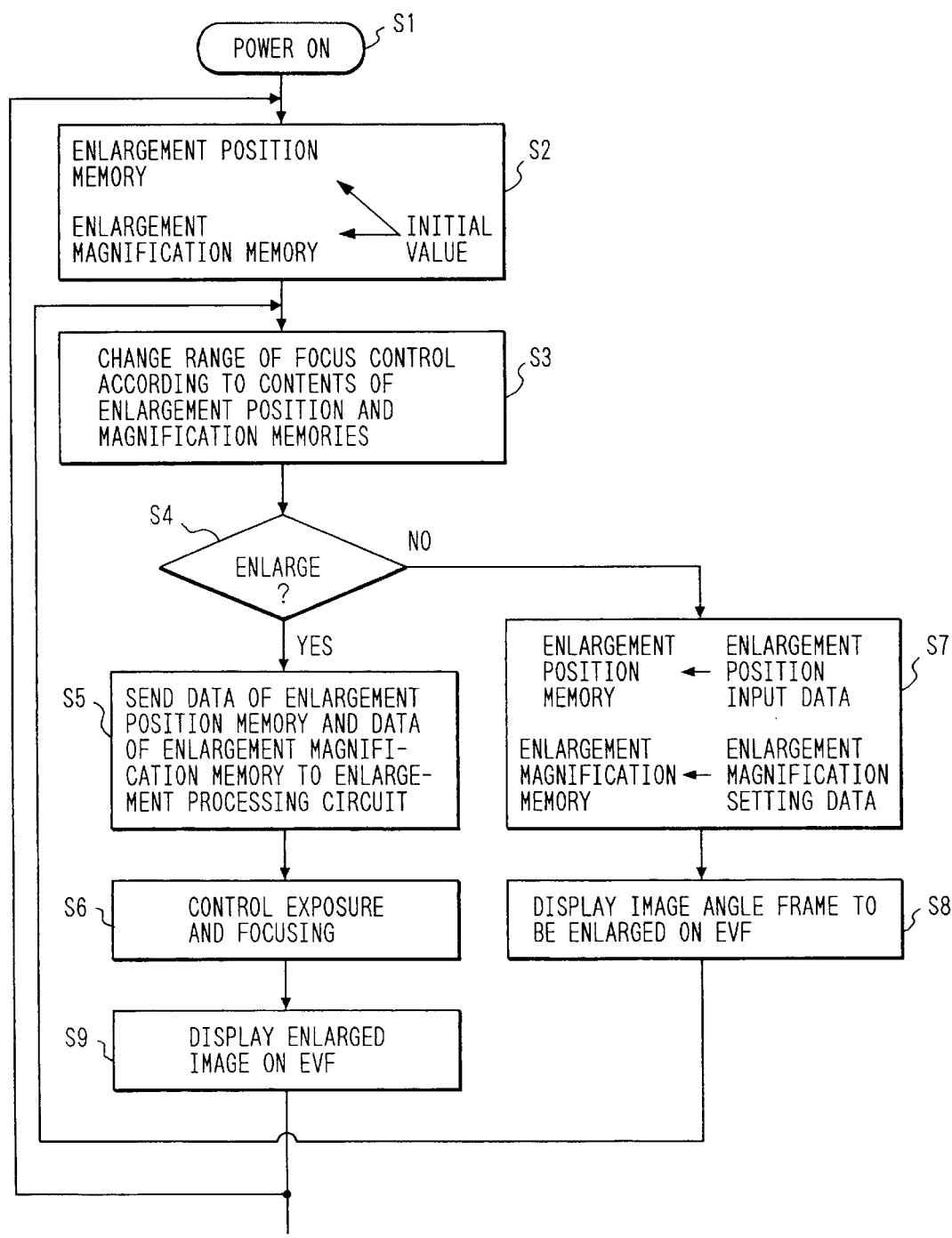
FIG. 2 is a flow chart showing the operation of the first embodiment of the present invention.

FIG. 2 is a flow chart showing processing to be performed by the microcomputer 9 in executing an actual enlargement function in response to such an operation performed by the user.

Referring to FIG. 2, when the power supply is turned on in step S1, the microcomputer 9 starts to operate.

In step S2, the data of the initial value of a predetermined enlargement position is stored in the enlargement position memory and the enlargement magnification memory of the microcomputer 9.

In step S3, the image angle position for exposure control and focus control is changed in accordance with the contents of the enlargement position and magnification memories.

More specifically, referring to FIG. 1, the microcomputer 9 supplies the position information of a range to be enlarged in a frame and the information of the size (magnification) of the range to the gate circuits 18 and 20 for respectively forming a photometric area and a focus detection area. With this operation, the microcomputer 9 performs control to set the positions of the photometric area and the focus detection area at the central position of the range to be enlarged in the frame, and change the sizes of the areas in accordance with the enlargement range.

With this control, a correct exposure amount and a correct focus state can be set with respect to an image portion, in a frame, which is to be enlarged by the user, thereby solving the following conventional problem. In a conventional technique, when an image is enlarged, the enlarged image portion is different from an area where photometry or focus detection is actually performed, resulting in an inappropriate image.

In addition, the reference levels for exposure control and focus detection are changed, as needed, in accordance with changes in the sizes of the photometric area and the focus detection areas. This operation is performed to correct any change in average signal level which is caused by a change in the area of each detection area.

In step S4, the microcomputer 9 checks whether an enlargement execution signal is input from the enlargement execution switch 8. If YES in step S4, the flow advances to step S5. If NO in step S4, the flow advances to step S7. If the enlargement execution button is depressed in step S4, and the flow advances to step S5, the microcomputer 9 supplies the enlargement position information and the enlargement magnification information stored in the enlargement position and magnification memories to the enlargement processing circuit 5.

In step S6, the microcomputer 9 performs exposure and focus control for the image having undergone a change in image angle position.

In step S9, the image having undergone the above exposure and focus control is displayed on the EVF 12.

If it is determined in step S4 that the enlargement execution button is depressed, and the flow advances to step S7, the microcomputer 9 generates new enlargement position data and enlargement magnification data on the basis of signals input from the enlargement position input device 10 and the enlargement magnification setting device 13, and stores the data in the enlargement position and magnification memories, respectively.

In step S8, the microcomputer 9 generates an image angle frame to be enlarged on the basis of the data in the enlargement position and magnification memories, and supplies it to the enlargement position display circuit 11, thereby displaying an image angle frame to be enlarged like the one shown in FIG. 5 on the EVF 12. With this operation, the user can accurately recognize the position and the range, in the frame, where enlargement processing is to be performed, and hence can accurately understand the operation of the apparatus. In addition, an operation error can be prevented.

In the above manner, an image at a desired position in a frame is enlarged at a desired magnification, and focus control and exposure control operations are performed concurrently. The processing in steps S2 to S9 is repeatedly executed afterward.

The second embodiment of the present invention will be described next with reference to FIG. 6. This embodiment uses a viewpoint position detection device for detecting the viewpoint of the user on the screen of an EVF, and uses the detected viewpoint position as an image enlargement position instead of the enlargement position input device 10 for inputting an image enlargement position in the first embodiment.

Since the arrangement of the second embodiment is the same as that of the first embodiment except for this enlargement position input scheme, a description thereof will be omitted.

In this embodiment, a collimated light beam is projected from a light source onto the front portion of an eyeball of the user, and the user's visual axis is obtained by using a cornea reflection image formed by light reflected by the cornea and the imaging position of the pupil.

A method of detecting the viewpoint of a user will be described below with reference to FIGS. 7 and 8.

Figure 7:
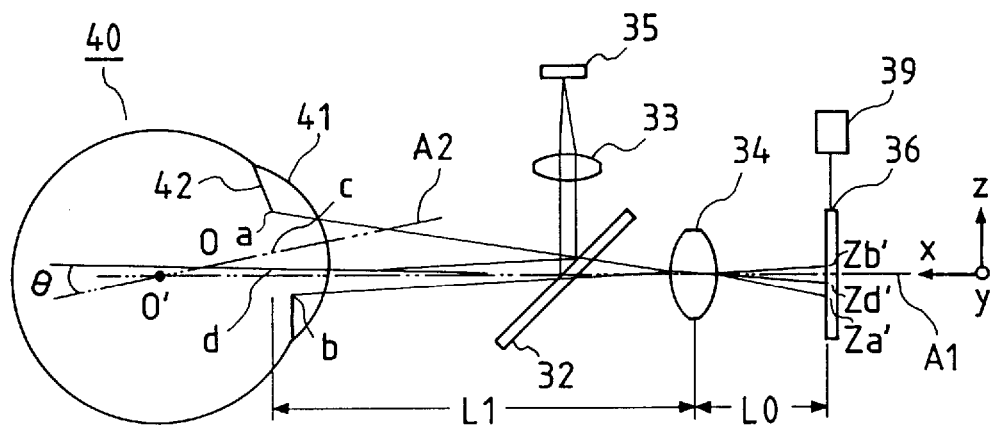
FIG. 7 is a schematic view showing a visual axis position detecting operation in the second embodiment of the present invention.

FIG. 7 is a schematic view of a viewpoint detection optical system. This system includes a half mirror 32, a projection lens 33, a light-receiving lens 34, a light source 35 such as a light-emitting diode for irradiating infrared light, to which the user is insensitive, onto the user on the focal plane of the projection lens 33, a photoelectric element array 36, and a viewpoint position processing circuit 39. FIG. 7 also shows an eyeball 40, a cornea 41, and an iris 42.

Figure 8:
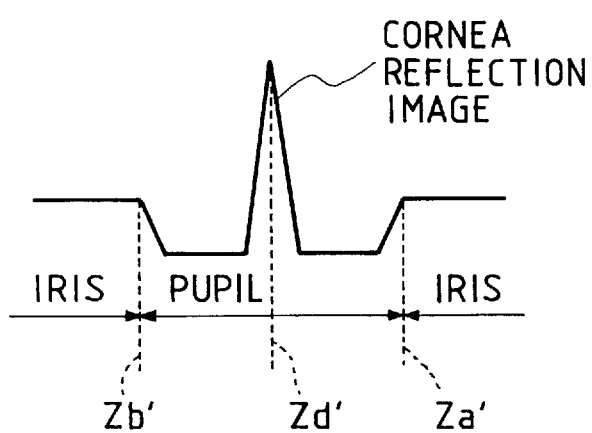
FIG. 8 is a schematic view showing the visual axis position detecting operation in the second embodiment of the present invention.

FIG. 8 is a view showing the intensity of an output signal from the photoelectric element array 36.

Referring to FIG. 7, infrared light emitted from the light source 35 is collimated by the projection lens 33. The collimated light is then reflected by the half mirror 32 to be projected on the surface of the eyeball 40 to irradiate the cornea 41.

At this time, a cornea reflection image d formed by a portion of the infrared light reflected by the surface of the cornea 41 passes through the half mirror 32 and the light-receiving lens 34 to form images of end portions a and b of the reflection image at positions $Za'$ and $Zb'$ on the photoelectric element array 36 (see FIG. 8 as well).

Let $Za$ and $Zb$ be the Z-coordinates of the end portions a and b of the iris 42 when a rotation angle $\theta$ of an optical axis A2 of the eyeball with respect to the optical axis (optical axis A1) of the light-receiving lens 34 is small. Then, a central coordinate $Zc$ of the iris 42 is given by $$Zc=(Za+Zb)/2 \tag{1}$$

Let $Zd$ be the Z-coordinate of a position d at which the cornea reflection image is generated, and OC be the distance from a curvature center O of the cornea 41 to a center C of the iris 42. Then, the rotation angle $\theta$ of the optical axis B of the eyeball nearly satisfies $$\theta c \times \sin\theta = Zc - Zd \tag{2}$$

In this case, the Z-coordinate $Zd'$ of the position D of the cornea reflection image coincides with a Z-coordinate Z of the curvature center O of the cornea 41. For this reason, in the viewpoint position processing circuit 39, as shown in FIG. 8, the rotation angle $\theta$ of the optical axis B of the eyeball can be obtained by detecting the positions of specific points (the cornea reflection image d and the end portions a and b of the iris) projected on the surface of the photoelectric element array 36. In this case, equation (1) can be rewritten into $$\beta \times OC \times \sin\theta = (Za'-Zb')/2 - Zd' \tag{3}$$

where $\beta$ is the magnification determined by a distance L1 between the position d, at which the cornea reflection image is generated, and the light-receiving lens 34, and a distance L0 between the light-receiving lens 34 and the photoelectric element array 36. The magnification $\beta$ is normally kept almost constant.

Viewpoint calculation processing will be described next with reference to the flow chart in FIG. 9 and FIG. 10 which shows an eyeball reflection image on the photoelectric element array.

Figure 10:
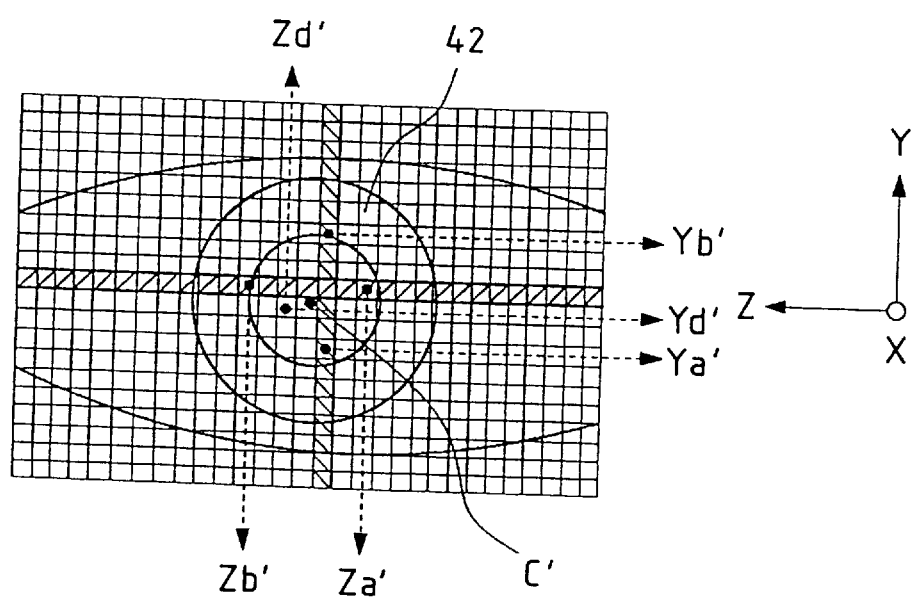
FIG. 10 is a view showing an eyeball reflection image to explain the visual axis position detecting operation in the present invention.

FIG. 10 shows coordinates Za', Zb', and Zd' which are the same coordinates as those described above, a center C' of the pupil, coordinates Yb' and Ya' of the upper and lower ends of the circumference of the pupil, and a Y-coordinate Yd' of a cornea reflection image.

Figure 9:
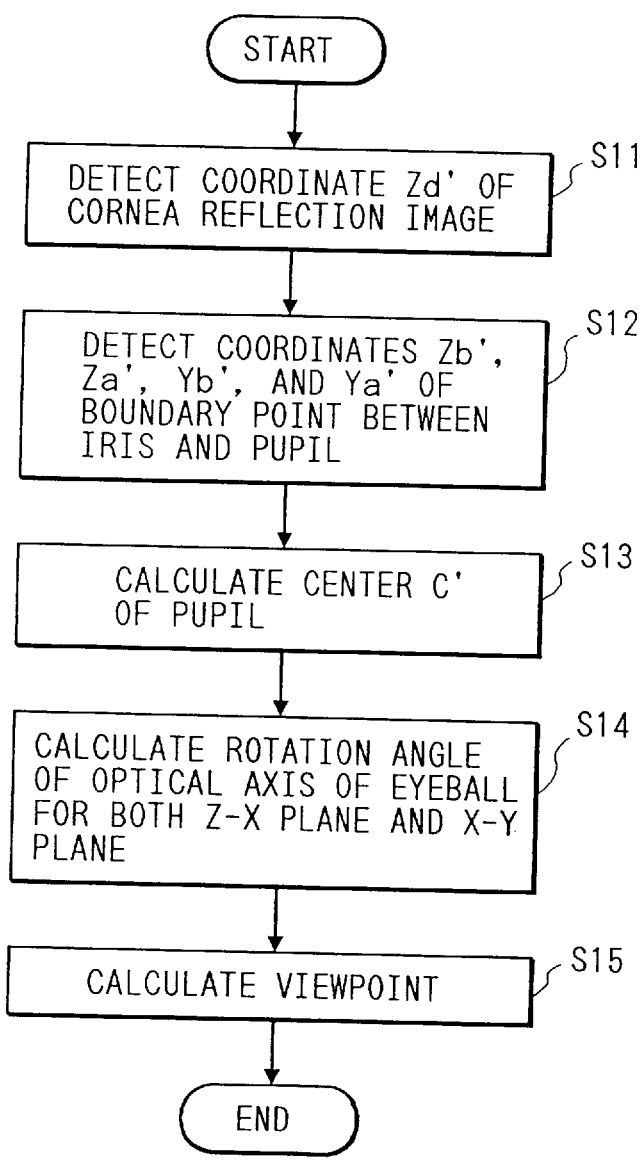
FIG. 9 is a flow chart for explaining a visual axis position detecting operation in the present invention.

Referring to the flow chart in FIG. 9, in step S11, the coordinate Zd' of the cornea reflection image in FIG. 10 is detected.

The flow then advances to step S12 to detect the coordinates Zb', Za', Yb', and Ya' of the boundary point between the iris and the pupil.

In step S13, the center C' of the pupil is calculated on the basis of the data obtained in step S12.

The flow advances to step S14 to calculate the rotation angle of the eyeball.

In this case, the rotation angles for both the Z-X plane and the X-Y plane are calculated. In step S15, a viewpoint is calculated from the rotation angles obtained in step S14.

Figure 6:
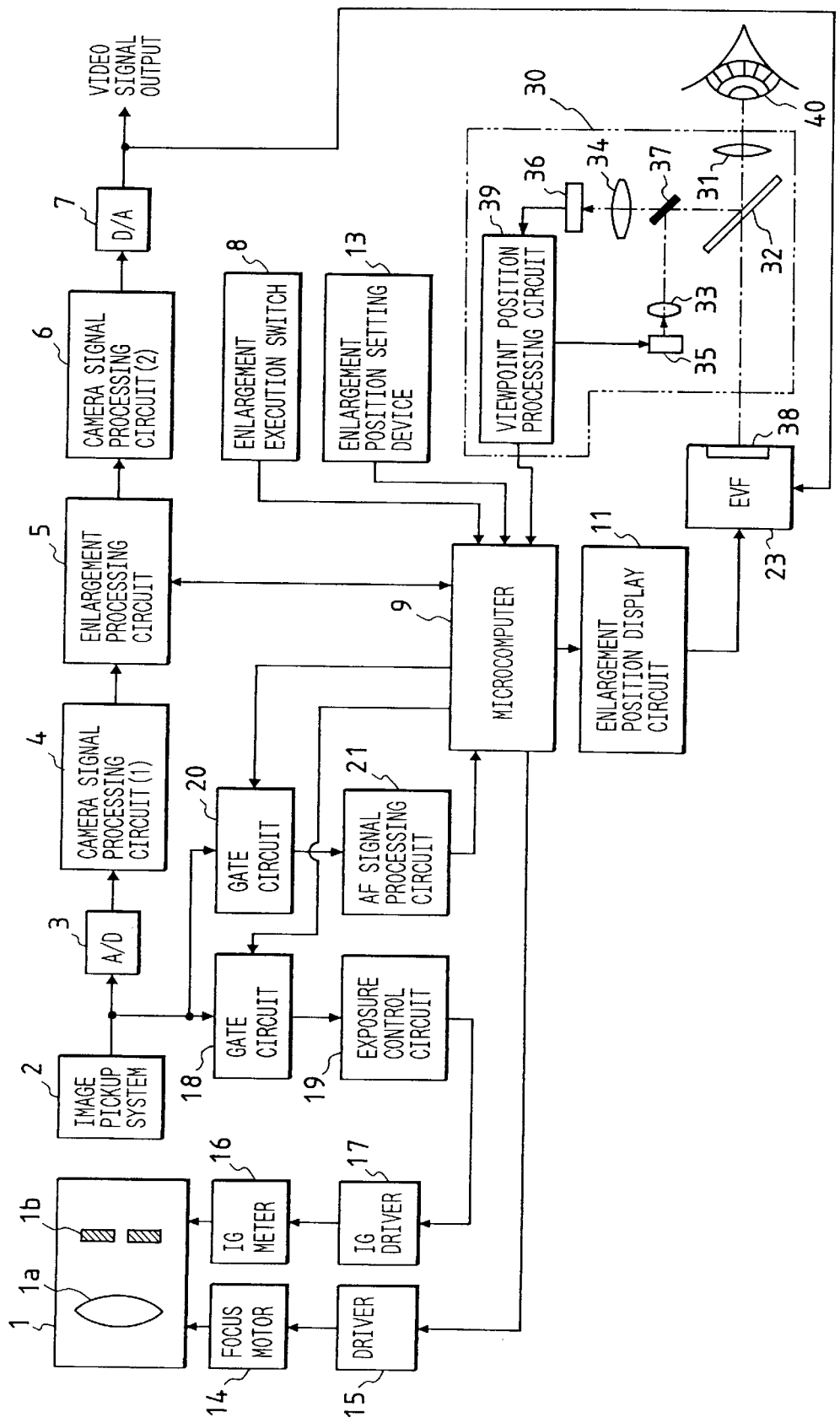
FIG. 6 is a block diagram showing the second embodiment of the present invention.

FIG. 6 is a block diagram showing an arrangement in which the above viewpoint detection method is applied to an enlargement position input device.

Referring to FIG. 6, the viewpoint detection circuit system is constituted by an eyepiece lens 31, an infrared light projection half mirror 37, a finder screen 38, and the viewpoint position processing circuit 39. The remaining components are the same as those of the viewpoint detection optical system in FIG. 7.

Referring to FIG. 6, infrared light emitted from the light source 35 passes through the projection lens 33 and is reflected by the half mirrors 37 and 32 to reach the eyeball 40.

The light reflected by the eyeball 40 is reflected by the half mirror 32 and reaches the photoelectric element array 36 through the light-receiving lens 34.

An image pickup frame displayed on the finder screen 38 reaches the eyeball 40 through the half mirror 32 and the eyepiece lens 31, thereby allowing the user to check the image on an electronic viewfinder (EVF) 32. Meanwhile, the viewpoint position of a user is detected.

The viewpoint position processing circuit 39 processes an output signal from the photoelectric element array 36 by using the above viewpoint detection method, and transmits an enlargement position input signal desired by the user to a microcomputer 9.

The microcomputer 9 can enlarge an image at a desired position in the frame by using the viewpoint position coordinates of the user as position information for enlargement processing and executing the processing in accordance with the same procedure as that in the first embodiment described above.

According to this embodiment, the user can designate a position and a range for enlargement processing with his/her viewpoint while monitoring the image on the EVF 23. A photographing operation therefore need not be interrupted, resulting in excellent operability.

Since the viewpoint position can be displayed on the EFF 23 through the enlargement position display circuit 11, the user can accurately recognize the position and range for enlargement processing at all times.

As has been described above, according to the above embodiments, in executing an enlargement function such as an electronic zoom function or an electronic closeup function, the focus detection range and the photometric range for exposure control are changed in accordance with the image angle to be enlarged. For this reason, exposure control and focus detection are performed with respect to the new image angle, and exposure control and focus detection control are completed at the same time as actual enlargement processing is completed, thereby always obtaining an image having undergone correct focus control and correct exposure control.

According to the above embodiments, in performing interpolation processing of a portion of an image, as soon as the image to be interpolated is determined, exposure control and focus detection are performed for the new image. Exposure control and focus detection control are completed at the same time as actual interpolation processing is completed. As a result, a proper image can be obtained.

According to the above embodiments, in executing an enlargement function such as an electronic zoom function or an electronic closeup function, as soon as the image angle to be enlarged is determined, focus detection is performed with respect to the new image angle. Focus detection control is completed at the same time as actual enlargement processing is completed. As a result, a proper image can be obtained.

According to the above embodiments, in executing an enlargement function such as an electronic zoom function or an electronic closeup function, as soon as the image angle to be enlarged is determined, exposure control is performed with respect to the new image angle. Exposure control and focus detection control are completed at the same time as actual enlargement processing is completed. As a result, a proper image can be obtained.

According to the above embodiments, an enlargement range in a frame can be selected by detecting the viewpoint of the user, and the user can set a position for enlargement processing while performing a photographing operation. No complicated operation therefore is required, and hence the operability is greatly improved, thereby increasing the degree of freedom in photography.

What is claimed is:

1. An image pickup apparatus comprising:

image pickup means;

enlargement means for performing enlargement processing of an image by electronically enlarging an image pickup signal output from said image pickup means;

selection means for selecting a portion, of the image in a frame, which is to be enlarged by said enlargement means;

focus detection means for detecting a focus state by extracting a predetermined signal, which changes in accordance with the focus state, from an image pickup signal corresponding to a predetermined focus detection range in the frame;

exposure control means for detecting an exposure state by extracting a signal corresponding to the exposure state from the image pickup signal corresponding to a predetermined exposure control range in the frame; and control means for operating said focus detection means and said exposure control means in accordance with a selecting operation performed by said selection means to move positions of the focus detection range and the exposure control range to a position of an enlargement portion in the frame selected by said selection means.

2. An apparatus according to claim 1, wherein said selection means comprises viewpoint position detection means for detecting a viewpoint of a user on a monitor screen.

3. An image pickup apparatus comprising:

image pickup means;

interpolation means for performing interpolation processing for an image pickup signal output from said image pickup means;

selection means for selecting a portion, of the image in a frame, which is to be interpolated by said interpolation means;

focus detection means for detecting a focus state by extracting a predetermined signal, which changes in accordance with the focus state, from an image pickup signal corresponding to a predetermined focus detection range in the frame;

exposure control means for detecting an exposure state by extracting a signal corresponding to the exposure state from the image pickup signal corresponding to a predetermined exposure control range in the frame; and control means for operating said focus detection means and said exposure control means in accordance with a selecting operation performed by said selection means to move positions of the focus detection range and the exposure control range to a position in the frame selected by said selection means, and also operating said focus detection means and said exposure control means to display the image interpolated by said interpolation means at the same time as the operations of said focus detection means and said exposure control means are completed.

4. An apparatus according to claim 3, wherein said selection means comprises viewpoint detection means for detecting the viewpoint of the user on the monitor screen.

5. An image pickup apparatus comprising:

image pickup means;

enlargement means for performing enlargement processing of an image by electronically enlarging an image pickup signal output from said image pickup means;

selection means for selecting a portion, of the image in a frame, which is to be enlarged by said enlargement means;

focus detection means for detecting a focus state by extracting a predetermined signal, which changes in accordance with the focus state, from an image pickup signal corresponding to a predetermined focus detection range in the frame; and control means for operating said focus detection means in accordance with a selecting operation performed by said selection means to move a position of the focus detection range to a position of an enlargement portion in the frame selected by said selection means.

6. An apparatus according to claim 5, wherein said selection means comprises viewpoint position detection means for detecting a viewpoint of a user on a monitor screen.

7. An image pickup apparatus comprising:

image pickup means;

enlargement means for performing enlargement processing of an image by electronically enlarging an image pickup signal output from said image pickup means;

selection means for selecting a portion, of the image in a frame, which is to be enlarged by said enlargement means;

exposure control means for detecting an exposure state by extracting a signal corresponding to the exposure state from the image pickup signal corresponding to a predetermined exposure control range in the frame; and control means for operating said exposure control means in accordance with a selecting operation performed by said selection means to move a position of the exposure control range to a position of an enlargement portion in the frame selected by said selection means.

8. An apparatus according to claim 7, wherein said selection means comprises viewpoint position detection means for detecting a viewpoint of a user on a monitor screen.

9. An image pickup apparatus comprising:

image pickup means;

image enlargement means for electronically enlarging an image pickup signal output from said image pickup means;

image pickup control means for controlling an image pickup state of said image pickup means; and control means for controlling said image pickup control means in accordance with an image enlarging operation of said image enlargement means, and controlling said image pickup control means before an executing of the operation of the image enlargement means to change the state of said image pickup means to an image pickup state suitable for an image performed the image enlarging operation by said image enlargement means.

10. An apparatus according to claim 9, wherein the image pickup state of said image pickup means is a focus state.

11. An apparatus according to claim 9, wherein the image pickup state of said image pickup means is an exposure state.

12. An apparatus according to claim 10, wherein said control means changes a position and size of a focus detection area in a frame in accordance with an image enlarging operation of said image enlargement means, and changes the position and size of the focus detection area in accordance with an image having undergone enlargement processing before said image enlargement means is operated to perform an image enlarging operation.

13. An apparatus according to claim 11, wherein said control means changes a position and size of a photometric area in a frame in accordance with an image enlarging operation of said image enlargement means, and changes the position and size of the photometric area in accordance with an image having undergone enlargement processing before said image enlargement means is operated to perform an image enlarging operation.

14. An apparatus according to claim 9, further comprising pointing means for designating an enlargement position of an image in a frame.

15. An apparatus according to claim 14, wherein said pointing means is a viewpoint detection means for detecting a visual axis of a user.

16. An image pickup apparatus comprising:

image pickup means;

zooming means for electrically zooming an image pickup signal output from said image pickup means;

image pickup control means for controlling an image pickup state of said image pickup means; and control means for controlling said image pickup control means in accordance with a zooming operation of said zooming means, and controlling said image pickup control means before performing of the zooming operation of the image pickup means to an image pickup state suitable for an image performed the zooming operation by said zooming means.

17. An apparatus according to claim 16, wherein the image pickup state of said image pickup means is a focus state and/or an exposure state.

18. An apparatus according to claim 17, wherein said control means changes a position and size of a focus detection area in a frame in accordance with a zooming operation of said zooming means, and changes the position and size of the focus detection area in accordance with an image having undergone enlargement processing before said image enlargement means is operated to perform a zooming operation.

19. An apparatus according to claim 17, wherein said control means changes a position and size of a photometric area in a frame in accordance with a zooming operation of said zooming means, and changes the position and size of the photometric area in accordance with an image having undergone enlargement processing before said image enlargement mean is operated to perform a zooming operation.

20. An apparatus according to claim 16, further comprising pointing means for designating a zooming position of an image in a frame.

21. An apparatus according to claim 20, wherein said pointing means is viewpoint detection means for detecting a visual axis of a user.

* * * * *